(12) United States Patent
Sprygada et al.

(10) Patent No.: US 11,249,747 B2
(45) Date of Patent: *Feb. 15, 2022

(54) SYSTEM AND METHOD OF UPDATING A NETWORK ELEMENT

(71) Applicant: Arista Networks, Inc., Santa Clara, CA (US)

(72) Inventors: Peter Raymond Sprygada, Cary, NC (US); Mark Berly, Pittsboro, NC (US); Douglas Gourlay, Menlo Park, CA (US)

(73) Assignee: Arista Networks, Inc., Santa Clara, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 16/719,579

(22) Filed: Dec. 18, 2019

(65) Prior Publication Data

US 2020/0117441 A1 Apr. 16, 2020

Related U.S. Application Data

(63) Continuation of application No. 15/057,880, filed on Mar. 1, 2016, now Pat. No. 10,545,753.

(Continued)

(51) Int. Cl.
*G06F 8/61* (2018.01)
*G06F 8/656* (2018.01)
(Continued)

(52) U.S. Cl.
CPC .............. *G06F 8/654* (2018.02); *G06F 8/61* (2013.01); *H04L 41/082* (2013.01); *G06F 8/65* (2013.01); *G06F 8/656* (2018.02)

(58) Field of Classification Search
CPC ....... H04L 41/082; H04L 45/22; G06F 8/656; G06F 8/65; G06F 8/60; G06F 8/70; G06F 8/654; G06F 8/61
See application file for complete search history.

(56) References Cited

U.S. PATENT DOCUMENTS 6,594,744 B1 7/2003 Humlicek et al.
7,383,541 B1 6/2008 Banks et al.
(Continued)

FOREIGN PATENT DOCUMENTS

JP 2012-221268 A 11/2012

OTHER PUBLICATIONS

PCT International Search Report and Written Opinion for PCT International Appln No. PCT/US2016/028170 dated Jul. 11, 2016, 12 pages.

(Continued)

*Primary Examiner* — Wei Y Zhen
*Assistant Examiner* — Brahim Bourzik
(74) *Attorney, Agent, or Firm* — Fountainhead Law Group P.C.

(57) ABSTRACT

A method and apparatus of a device that performs a hitless update a boot image of a network element. In this embodiment, the device identifies the network element to update and determines if the network element has redundant paths. If this network element has redundant paths, the device configures the network element to drain data processing of the network element. In addition, the device updates the network element to a new boot image when the data processing of the network element is drained.

20 Claims, 8 Drawing Sheets

Related U.S. Application Data

(60) Provisional application No. 62/300,710, filed on Feb. 26, 2016, provisional application No. 62/183,130, filed on Jun. 22, 2015, provisional application No. 62/150,787, filed on Apr. 21, 2015.

(51) Int. Cl.
*G06F 8/654* (2018.01)
*H04L 12/24* (2006.01)
*G06F 8/65* (2018.01)

(56) References Cited

U.S. PATENT DOCUMENTS

| | | | |
|---|---|---|---|
| 7,483,370 B1 | 1/2009 | Dayal | |
| 7,506,335 B1 | 3/2009 | Wooff et al. | |
| 8,274,989 B1 * | 9/2012 | Allan | H04L 45/50 370/432 |
| 8,627,137 B1 * | 1/2014 | Vaidya | H04L 41/0659 714/4.2 |
| 8,930,318 B1 | 1/2015 | Petkov et al. | |
| 8,943,490 B1 * | 1/2015 | Jain | H04Q 3/54516 717/168 |
| 10,732,961 B1 * | 8/2020 | Madasamy | G06F 8/656 |
| 10,938,653 B2 * | 3/2021 | Sadana | H04L 41/0859 |
| 2003/0202473 A1 | 10/2003 | Patrick et al. | |
| 2003/0210705 A1 | 11/2003 | Seddigh | |
| 2003/0212752 A1 | 11/2003 | Thunquest et al. | |
| 2005/0078656 A1 | 4/2005 | Bryant | |
| 2005/0267951 A1 | 12/2005 | Josh et al. | |
| 2006/0007944 A1 | 1/2006 | Movassaghi et al. | |
| 2006/0143432 A1 | 6/2006 | Rothman et al. | |
| 2009/0132791 A1 | 5/2009 | Lo | |
| 2009/0185496 A1 | 7/2009 | Doverspike | |
| 2009/0190478 A1 * | 7/2009 | Li | H04L 12/42 370/238 |
| 2009/0279549 A1 | 11/2009 | Ramanathan | |
| 2010/0002577 A1 | 1/2010 | Moreno | |
| 2010/0027427 A1 | 2/2010 | Kokje | |
| 2011/0158113 A1 | 5/2011 | Hashiguchi | |
| 2012/0252443 A1 | 6/2012 | Rhode et al. | |
| 2013/0290945 A1 | 10/2013 | Sawal | |
| 2013/0305236 A1 | 11/2013 | Ramanathan et al. | |
| 2014/0019661 A1 | 1/2014 | Hormuth et al. | |
| 2014/0032889 A1 | 1/2014 | Koenen et al. | |
| 2014/0258479 A1 | 1/2014 | Tenginakai | |
| 2014/0050077 A1 | 2/2014 | Kasat | |
| 2014/0059530 A1 | 2/2014 | Banavalikar | |
| 2014/0269254 A1 * | 9/2014 | Choorakkot Edakkunni | H04L 45/563 370/218 |
| 2015/0040115 A1 | 2/2015 | Capper | |
| 2015/0043331 A1 * | 2/2015 | Hu | H04L 47/34 370/228 |
| 2016/0055579 A1 | 2/2016 | McDonough | |
| 2016/0057052 A1 | 2/2016 | Zhang et al. | |
| 2016/0313985 A1 | 10/2016 | Sprygada et al. | |
| 2016/0315803 A1 | 10/2016 | Sadana et al. | |
| 2017/0168803 A1 | 6/2017 | Katiyar | |
| 2020/0142775 A1 * | 5/2020 | Kotak | H04L 41/082 |

OTHER PUBLICATIONS

PCT International Search Report and Wrtten Opinion for PCT International Appln No. PCT/US2016028171 dated Jul. 11, 2016 (11 pages).

European Patent Office, Extended European Search Report, EP Application No. 16783663.4, dated Aug. 14, 2018, 9 pages.

Dennis Schwerdel et al., "German-Lab Experimental Facility", Sep. 20, 2010, 10 pages.

* cited by examiner

SYSTEM AND METHOD OF UPDATING A NETWORK ELEMENT

This application is a continuation application and, pursuant to 35 U.S.C. § 120, is entitled to and claims the benefit of earlier filed application U.S. application Ser. No. 15/057,880 filed Mar. 1, 2016, which in turn claims the benefit of U.S. Provisional Patent Application No. 62/300,710 filed Feb. 26, 2016 and U.S. Provisional Patent Application No. 62/183,130 filed Jun. 22, 2015 and U.S. Provisional Patent Application No. 62/150,787 filed Apr. 21, 2015, all of which are hereby incorporated by reference in their entirety for all purposes.

FIELD OF INVENTION

This invention relates generally to data networking, and more particularly, to updating network element boot image for a network element in a network without dropping data in the network.

BACKGROUND OF THE INVENTION

For a network with multiple network elements, each network element runs a particular version of software along with a specific configuration for that software. Periodically, the software and/or the configuration of one or more of the network elements are updated. Sometimes, the software and/or configuration updates leads to poor performance or disruption because of problems with the software configuration, incompatibilities between different software configurations on different network elements, loss of connectivity due to incorrect Virtual Local Area Network (VLAN) membership change on a port, incorrect Access Control List (ACL) entry, incorrect route metric change, or other types of problems.

In one example, the network element is upgraded to a new software image to add new features and/or fix problems with the current software image. Alternatively, the network image can be downgraded to a previous version of the software image. To change the software image, the network element loads the new software image, marks this new software image as the current software image, and reboots the network element. As the network element boots up, the new software image is loaded and programs the control and data planes of the network element.

A problem with this way of upgrading or downgrading the software image is that, by rebooting the network element, the network element is inoperable for a relatively long time. For example, rebooting the network element can cause the network element to be off-line for upwards of five minutes. During this off-line time, the data processing functions of the network element are inoperable. This can lead to an interruption of data networking services that rely on the network element.

SUMMARY OF THE DESCRIPTION

A method and apparatus of a device that performs a hitless update a boot image of a network element. In this embodiment, the device identifies the network element to update and determines if the network element has redundant paths. If this network element has redundant paths, the device configures the network element to drain data processing of the network element. In addition, the device updates the network element to a new boot image when the data processing of the network element is drained.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
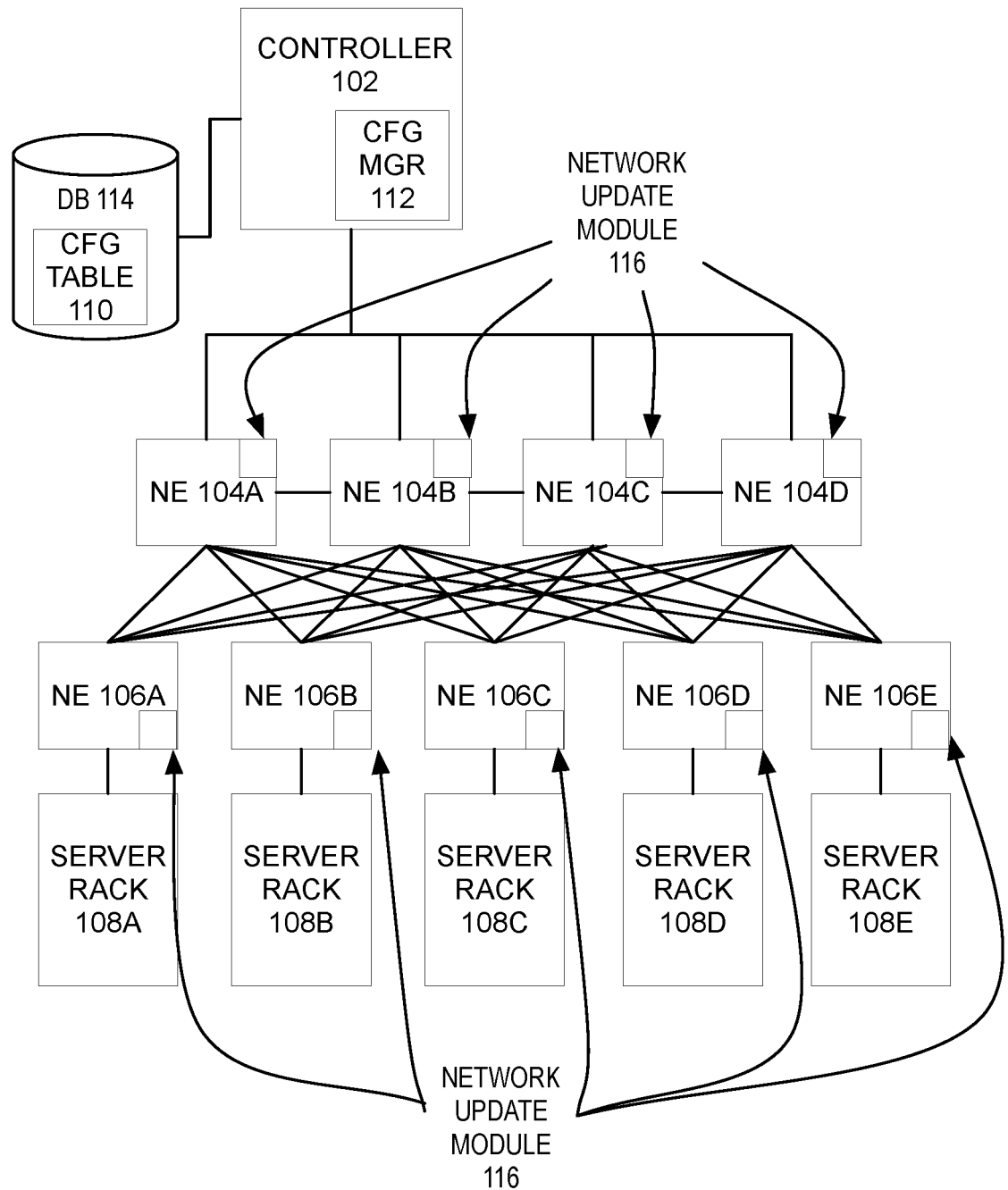
FIG. 1 is a block diagram of one embodiment of a network with a controller that updates the boot images of the network elements in the network.

A method and apparatus of a device that performs a hitless update a boot image of a network element. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device that performs a hitless update a boot image of a network element. In one embodiment, a device updates the boot image by putting the network element into a maintenance mode before the network element is updated. In this embodiment, the network element is part of redundant paths between one or more pairs of endpoints in the network. A maintenance mode for a network element is a configuration for the network element where one or more the paths that include the network element are disfavored paths such that other network elements will select other paths that do not include this network element that is in maintenance mode. Furthermore, the network element in maintenance mode is not taken out of the network. Instead, the device has configured the network element such that this network element is still an active device in the network, but this network element is a disfavored destination in for different forwarding decision making for the other network elements (e.g., routing, switching, and/or other forwarding decisions).

In one embodiment, the device puts the network element in maintenance mode by configuring each layer in a network stack for maintenance mode. For example and in one embodiment, the device configures the routing policy (layer 3) for maintenance mode. In this example, the device increases the cost of routes from that network element to other network elements and/or devices in the network. In addition, the device verifies the maintenance mode configuration for the routing policy. Furthermore, the device configures and verifies the virtual interface layer (layer 3) for maintenance mode. The device additionally configures and verifies the logical interface layer (layer 2) for maintenance mode by configuring the switch forwarding costs for paths that include this network element to be higher such that other network elements would not select these paths. In one example, the device increases spanning tree costs of paths that include this network element. The device further configures and verifies the physical interface layer (layer 1) for maintenance mode.

With the network element in maintenance mode, the data processing of transported network data being performed by this network element is essentially zero, because this network data is being forwarded through other network elements. With no or very little data being transported through the network element to be updated, this network element can be updated with a new boot image with little or no impact on this transported data, because any interruption in the network element would not impact the transported data (e.g., a reboot of the network element during the update process would not interrupt the transported data processing).

In one embodiment, once the network element is updated, the device rolls back the maintenance mode layer by layer for the network elements, verifying the changes made at each layer, and in reverse order. For example and in one embodiment, the device restores and verifies the physical layer (layer 1) to the configuration this network element had before the software update. With the physical layer configuration restored, the device restores and verifies the virtual layer (layer 2) to the configuration this network element had before the software update. Similarly, the device restores and verifies the logical layer (layer 3), followed by the routing policy, to the configuration this network element had before the software update.

FIG. 1 is a block diagram of one embodiment of a network 100 with a controller 102 that updates the boot images of the network elements in the network. In FIG. 1, the network 100 includes spine network elements 104A-D that are coupled to each of the leaf network elements 106A-E. The leaf network elements 106A-E are further coupled to server racks 108A-E, respectively. In one embodiment, a spine network element 104A-D is a network element that interconnects the leaf network elements 106A-E. In this embodiment, each of the spine network elements 104A-D is coupled to each of the leaf network elements 106A-E. Furthermore, in this embodiment, each of the spine network elements 104A-D is coupled with each other. While in one embodiment, the network elements 104A-D and 106A-E are illustrated in a spine and leaf topology, in alternate embodiments, the network elements 104A-D and 106A-E can be in a different topology. In addition, and in one embodiment, the network elements 104A-E are further coupled to a controller 102 and a database 114. In one embodiment, each of the network elements 104A-D and/or 106A-E can be a router, switch, bridge, gateway, load balancer, firewall, network security device, server, or any other type of device that can receive and process data from a network. In one embodiment, the network elements 104A-D and 106A-E can be the same or different network elements in terms of manufacturer, type, configuration, or role. For example and in one embodiment, network elements 104A-D may be routers and network elements 106A-E may be switches. As another example and embodiment, network elements 104A-D may be high capacity switches with relatively few 10 gigabit (Gb) or 40 Gb ports and network elements 106A-E may be lower capacity switches with a large number of medium capacity port (e.g., 1 Gb ports) and high capacity ports to couple to the spine network elements 104A-D.

In one embodiment, the controller 102 is a device that is used to support network-wide services for a network that includes multiple network elements. A network-wide service is a service that is used by two or more network elements. For example, the network-wide service can be a service that gathers known Media Access Control (MAC) addresses and assembles these addresses into a global MAC address database. This global MAC address database can be used to support a VxLAN controller service. In one embodiment, database 114 is an organized collection of data. As another example and embodiment, the ability to rollback or roll forward network elements to different configuration points is a network-wide service.

In one embodiment, the configuration manager 112 can initiate software upgrades that update the boot images for some or all of the network elements 104A-D and 106A-E. In this embodiment, an update to a boot image of a network element can be a downgrade to boot image previously used with a corresponding lower version software, an upgrade to boot image with a corresponding higher version software, or replacement boot image that has the same version software as currently running on that network element. This update to the boot image can be a hitless update or hit full update. In one embodiment, a hitless update to a network element, or group of network elements, is an update to the boot image that does not cause a loss in data processing. In this embodiment, a hitless update is performed and there is no loss or dropping of data packets by the network elements that are being updated. In contrast, a hit full update is an update of a boot image to a network element, or group of network elements, where there can be a loss or dropping of data packets by the network elements that are being updated. In one embodiment, each of the network elements 104A-D and/or 106A-E includes a network update module 116 that performs the software update.

Figure 2:
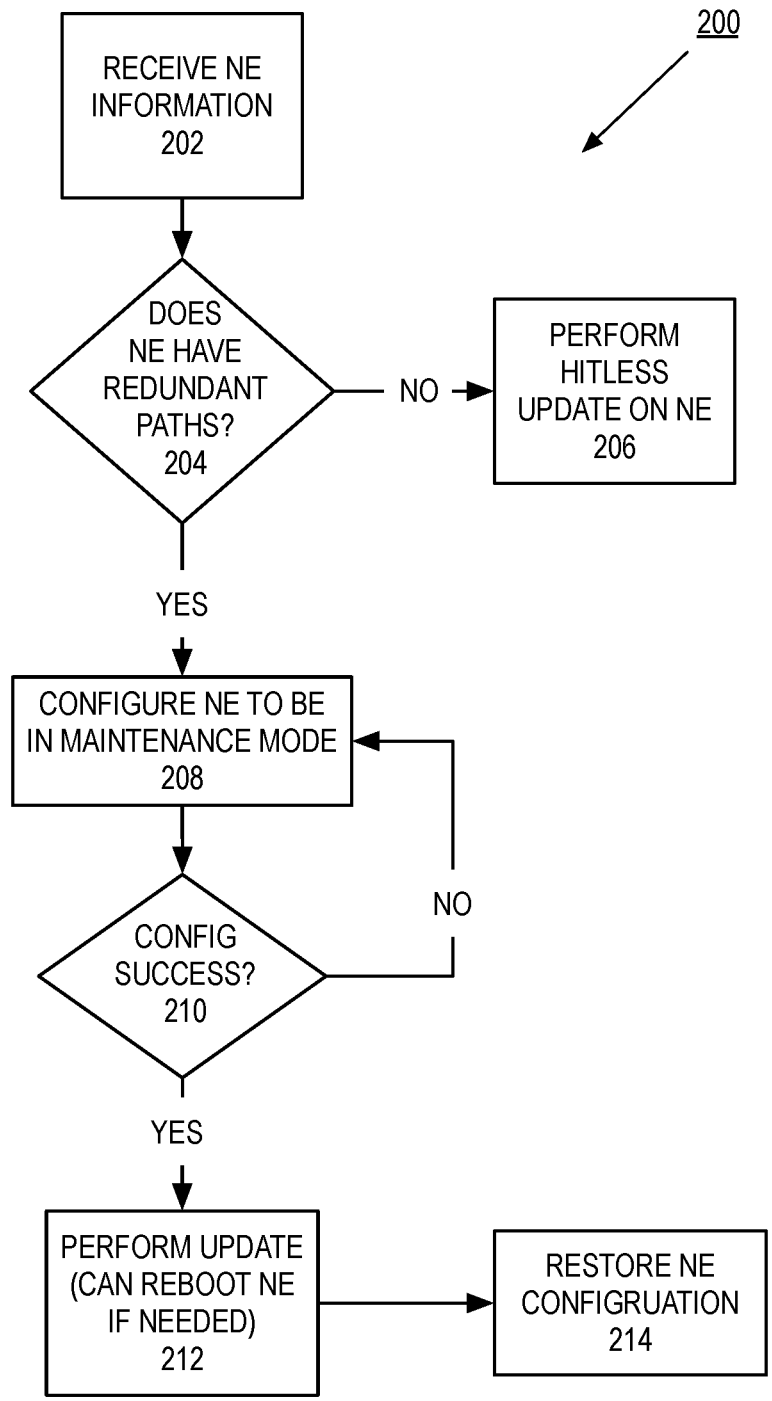
FIG. 2 is a flow diagram of one embodiment of a process to update a network element by utilizing redundant network capacity.

As above, a boot image update can be performed as a hitless or a hit full update. In one embodiment, a hitless update can be performed by draining the data processing needs on a network element that has redundant links with other network elements. FIG. 2 is a flow diagram of one embodiment of a process 200 to update a network element by utilizing redundant network capacity and putting that network element into maintenance mode. In one embodiment, process 200 is performed by a network update module, such as the network update module 116 described in FIG. 1 above. In FIG. 2, process 200 begins by receiving the network element information for the network element that is to be updated with a new boot image at block 202. In one embodiment, the network element information received includes information whether the network element has redundant links such that data processing can be diverted to other network elements while the network element boot images being updated. At block 204, process 200 determines if the network element has redundant paths. In one embodiment, a network element has redundant paths if there are other network elements that can perform the data processing the network element is currently performing. For example and in one embodiment, the network elements may be part of an equal cost multipath group or a link aggregate group that allows for multiple network elements to appear as one network element. As illustrated in FIG. 1 above, network elements 104A-D or 106A-E have redundant paths that allow others of these network elements to take over the data processing for one of the network elements. For example and in one embodiment, if network element 104A went off-line (e.g., to update a boot image), the other network elements 104B-D can take over the data processing for network element 104A. If the network element does not have redundant paths, process 200 performs a hitless update on the network element at block 206. In one embodiment, process 200 performs an accelerated software upgrade on the network element as described in U.S. patent application Ser. No. 14/449,030, entitled "System and Method for Accelerated Software Upgrades", filed on Jul. 31, 2014.

If the network element does have redundant paths, at block 208, process 200 configures the network element to be in maintenance mode. In one embodiment, process 200 puts the network element in maintenance mode by draining the data processing from the network element. In this embodiment, process 200 diverts the flow of data to the other network elements that have redundant paths for path(s) this network element participates in. In one embodiment, process 200 drains the data processing from the network element by increasing the cost for forwarding the data in this network element. In this embodiment, the network element will advertise its forwarding costs such that the flow of data will be diverted to the other network elements. For example and in one embodiment, network element 104A can increase the BGP cost to a large number (e.g., a large value or infinity) and advertise this cost, such that data will be diverted to network elements 104B-D. By increasing this forwarding cost, where the network element will advertise this cost, no data will eventually be forwarded to this network element. When no data is being forwarded to this network element, process 200 can update the boot image of this network element without any data loss. Putting the network element in maintenance mode is further described in FIG. 3 below.

At block 210, process 200 determines if the maintenance mode configuration was successful. In one embodiment, process 200 checks the maintenance mode configuration at each layer of configuration. If one of those layer configurations fails, process 200 reverts the previous layer configuration(s) to an original configuration for those layers and indicates a failure. If the maintenance mode configuration fails, execution proceeds to block 208 above. If the maintenance mode configuration is successful, process 200 performs the boot image update at block 210. In one embodiment, process 200 can perform the boot image update that involves a reboot of the network element. In this embodiment, even though the network element is rebooted during the boot image update process, this update is hitless because no data is lost during the rebooting. Process 200 restores the data processing configuration at block 214. In one embodiment, process 200 restores the data processing configuration by restoring the configuration for each layer of the network protocols for this network element. Restoring the data processing configuration is further described in FIG. 5 below.

Figure 3:
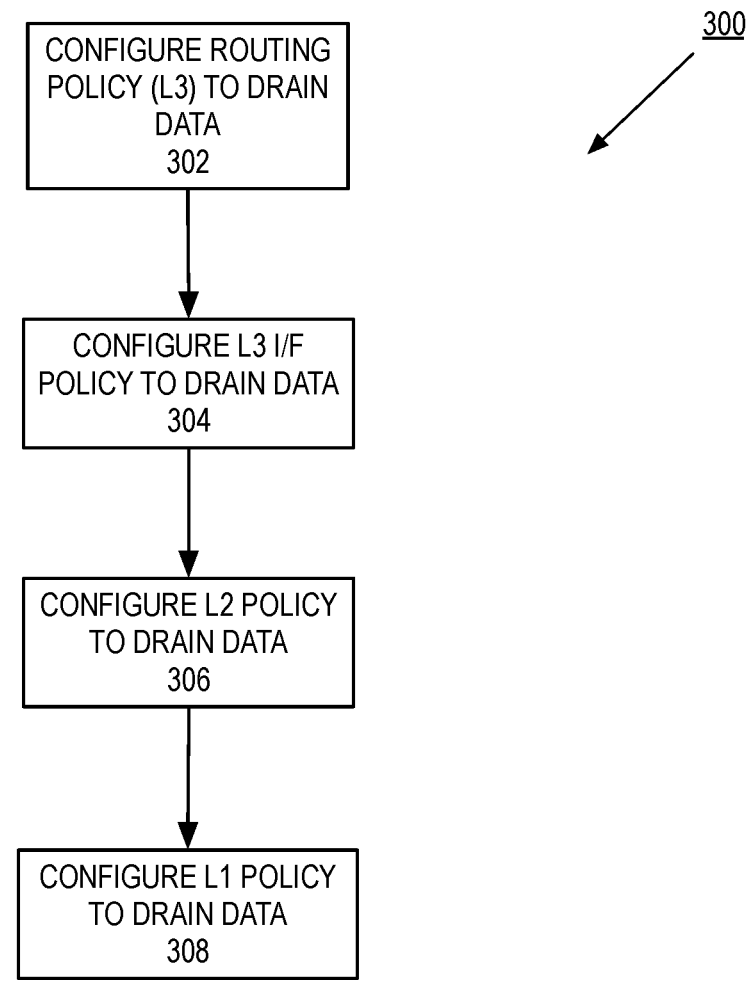
FIG. 3 is a flow diagram of one embodiment of a process to drain data processing of a network element.

As described above, process 200 drains the data processing for the network element by configuring the network element by putting the network element into maintenance mode. FIG. 3 is a flow diagram of one embodiment of a process 300 to put the network element into maintenance mode. In one embodiment, process 300 is performed by a drain data processing module, such as the drain data processing module 606 as described in FIG. 6 below. In FIG. 3, process 300 begins by configuring the routing policy (layer 3) of network element, so as to drain the data processing of the network element at block 302. In one embodiment, process 300 configures the routing policy (layer 3) of the network element so as to drain the layer 3 routing data processing from the network element. In one embodiment, process 300 configures the layer 3 routing policy so as to discourage data being routed through this network element. In this embodiment, the network element advertises the updated layer routing policy, such that other network elements would send the data to be routed to a different path that does not include this network element. In one embodiment, process 300 can configure the layer routing costs to be higher, so that these routes can be advertised as having the high cost. In this embodiment, other network element receiving the high cost advertised routes would select lower cost routes for the data. For example and in one embodiment, process 300 can configure the network element that routes for BGP, OSPF, or other types of routing protocol have a very high cost. By increasing the route costs, the network element would advertise these high cost routes to other network elements via one or more of the routing protocols (e.g., BGP, OSPF, and/or another type of routing protocol) and the other network elements receiving these route advertisements would select other paths that do not include this network element.

As another example and embodiment and referring to FIG. 1 above, if network element 104D is to be updated, network element 104D includes routes to network elements 104A-C and 106A-E. For each of these routes, there are alternate layer 3 routing paths between network elements 104A-C and 106A-E that do not go through network element 104D. In this example, process 300 increases cost of the routes to the other network elements and network element 104D advertises these high cost routes to the other network elements (106A-C and 104A-E). The other network elements 106A-C and 104A-E use the high cost of the advertised routes from network element 104D to make routing decisions. In this example, the other network elements 104A-C and 106A-E would not route data to network element 104D if there are alternate paths available to route the data. Thus, in this example, the layer 3 routing data processing load can be effectively zero as the other network elements 104A-C and 106A-E will select alternate routes that do not include network element 104D.

In this embodiment, the network element configured by process 300 is not taken out of the network. Instead, process 300 has configured the network element such that this network element is still an active device in the network, but this network element is a disfavored destination in the layer 3 routing decision making for the other network elements.

In one embodiment, after process 300 configures the layer 3 routing configuration as described above, process 300 verifies that this configuration leaves the network element in a stable state. In one embodiment, process 300 verifies the routing configuration by that the routing metrics have been increased to a sufficient level for some or all of the routing protocols. As described above, this policy of increasing the routing metrics is to drain the layer 3 data, so that the routing metrics (or admin distance in the case of multiple protocol deployment) are increased to ensure that this is the least preferred path, which by definition will remove them from the routing table At block 304, process 300 configures the logical layer 3 interface configuration. In one embodiment, process 300 configures the logical layer 3 interface by changing the routing metrics for this interface and that another interface is preferred over the other. For example and in one embodiment, process 300 can use the interface configuration command "ip OSPF cost" to change the routing metrics of OSPF routes.

In one embodiment, after process 300 configures the layer 3 routing configuration as described above, process 300 verifies that this configuration leaves the network element in a stable state. In one embodiment, process 300 verifies the logical interface configuration by performing a routing table check that would verify that paths are or are not programmed as intended. If the routes are not properly programmed, process 300 re-programs these routes and re-checks that re-programmed routes.

Process 300 configures the layer 2 virtual interface configuration to move the layer 2 data processing away from the network element at block 306. In one embodiment, process 300 increases the cost of layer 2 paths that includes this network element using spanning tree protocol. In this embodiment, process 300 increases the spanning tree path costs that involve the network element. For example and in one embodiment, if the network element 104D is to be updated, network element 104D includes layer 2 paths to network elements 104A-C and 106A-E. For each of these routes, there are alternate layer 2 paths between network elements 104A-C and 106A-E that do not go through network element 104D. In this example, process 300 increases the cost of the paths in the spanning tree such that network elements 104A-C and 106A-E would chose paths that do not include network element 104D. In this example, the other network elements 104A-C and 106A-E would not switch data to network element 104D if there are alternate paths available to switch this data. Thus, in this example, the layer 2 switching data processing load can be effectively zero as the other network elements 104A-C and 106A-E will select alternate paths that do not include network element 104D.

As with the layer 3 routing configuration described above, the network element configured by process 300 is not taken out of the network. Instead, process 300 has configured the network element such that this network element is still an active device in the network, but this network element is a disfavored destination in the layer 2 switching decision making for the other network elements.

In another embodiment, process 300 configures a multi-layer link aggregation group (MLAG) policy for this network element, such that this network element is removed from the operation of the MLAG. In this embodiment, process 300 signals to the network elements configured in the MLAG to move the MLAG data processing from the network element to be updated to the other network elements in the MLAG. In addition, process 300 shuts down the MLAG peer link(s) between the network element to be updated and the other network elements in the MLAG. Furthermore, process 300 shuts down the link between the network element to be updated and other network element(s) and/or devices that are downstream from this network element. By shutting down these link(s), process 300 removes an MLAG path through the network element to be updated and effectively diverting MLAG data processing to the other network elements involved in the MLAG.

In one embodiment, after process 300 configures the layer 2 switching configuration (e.g., spanning tree and/or MLAG) as described above, process 300 verifies that this configuration leaves the network element in a stable state. In one embodiment, process 300 verifies the layer 2 switching configuration by determining if the MLAG, spanning tree, and/or any other type of layer 2 states have converged. For example and in one embodiment, process 300 can invoke commands to show the state of the MLAG and/or spanning tree (e.g., show mlag detail, show spanning-tree and/or any other type of L2 information command). If one or more of the these layer 2 states have converged, then the network element is in a stable state. If these states have not converged, process 300 can wait for a time period (seconds, minutes, or another time period) and determine if the layer 2 network states have converged. At block 308, process 300 configures the physical interfaces of the network element to be updated for maintenance mode. In one embodiment, process 300 shuts down the physical interface(s) of the network element.

Figure 4:
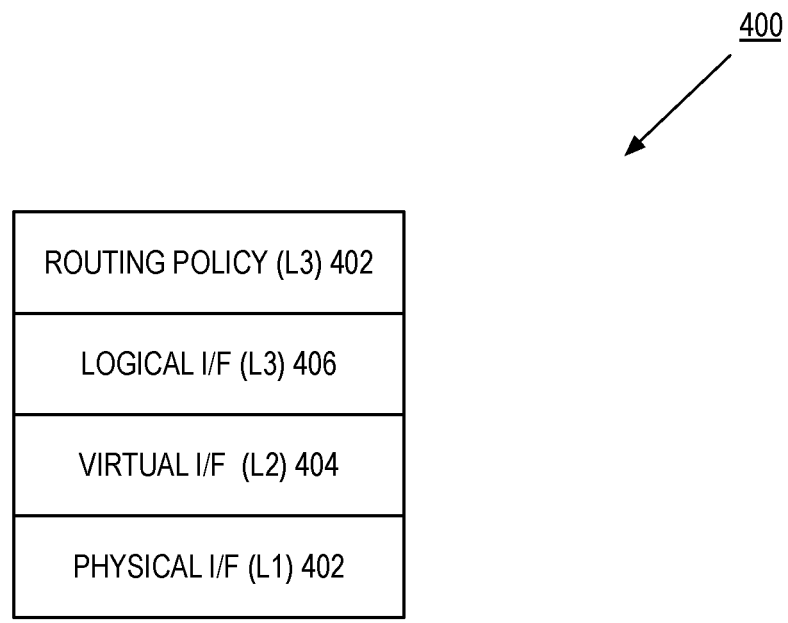
FIG. 4 is a block diagram of one embodiment of network layer hierarchy.

As described above, process 300 successively configures and verifies each layer of network protocols down to the physical layer. Furthermore, as will be described further below, a process (e.g., process 500 of FIG. 5) restores the configuration of the network element after that network element has been updated by successively configuring and verifying each layer up the network protocol stack. FIG. 4 is a block diagram of one embodiment of network layer stack 400. In FIG. 4, the network layer stack 400 includes four layers: a physical layer (layer 1) 402, a virtual layer (layer 2), a logical layer (layer 3) 406, and routing policy (layer 3) 408. In one embodiment, the physical layer 402 is the basic networking hardware transmission layer. In one embodiment, the physical layer is an Ethernet physical layer.

In one embodiment, the virtual layer (layer 2) 404 is layer above the physical layer 402 and is used to support the layer 2 services (e.g., switching, virtual local area network (VLAN), MLAG, and/or other layer 2 services). In one embodiment, the Media Access Control (MAC) addresses and the Ethernet protocol are defined in the virtual layer 402. Above the virtual layer 404 is the logical layer (layer 3) 406. In one embodiment, the logical layer (layer 3) 406 is used to support layer 3 services (e.g., Internet Protocol (IP) addressing, User Datagram Protocol (UDP), Transmission Control Protocol (TCP), routing based on IP addresses, Equal-cost multi-path routing (ECMP), multicast services, firewall or other types of security services, and/or other layer 3 services). In particular, and in one embodiment, routing policy (layer 3) 408 is built upon the logical layer 406. In this embodiment, the routing policy 408 includes the one or more different routing protocols that are configured on the network element to be updated. For example and in one embodiment, the network element to be updated may be running the BGP and/or OSPF routing protocols, which are routing protocols that use the logical layer interfaces (e.g., IP addresses) configured on this network element.

Figure 5:
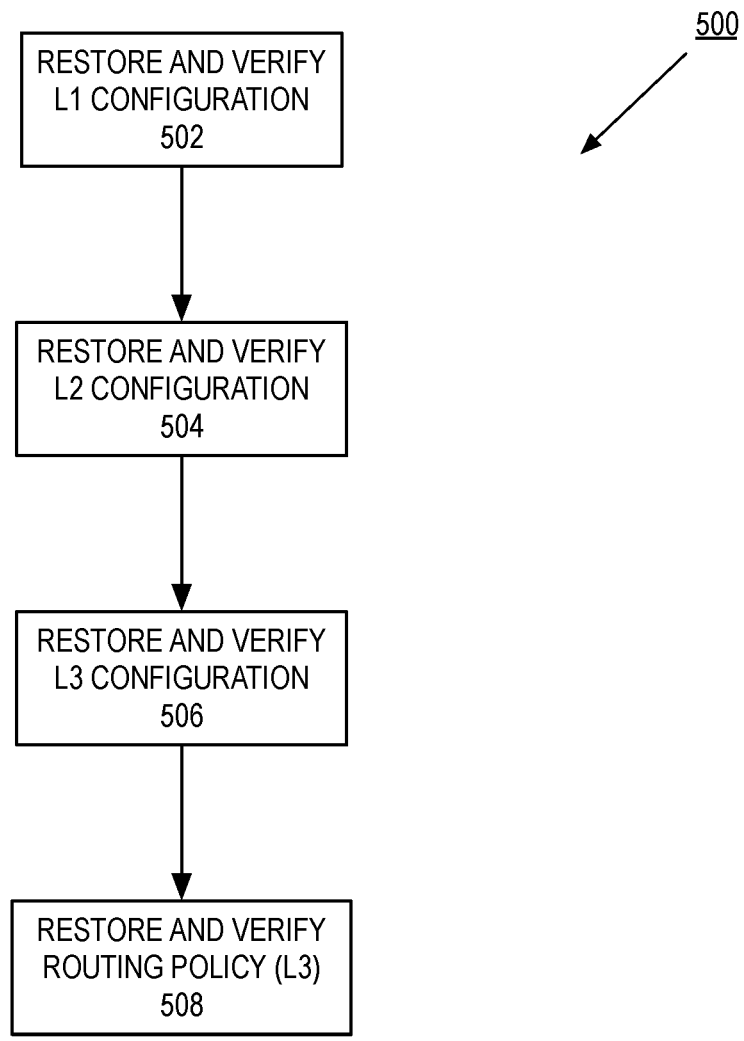
FIG. 5 is a flow diagram of one embodiment of a process to restore the data processing of a network element.

In one embodiment, after the network element is updated, process 200 restores the configuration, so as to re-insert this network element gracefully into the data processing load of the network. For example and in one embodiment, if the network element is configured for BGP routing or as part of an MLAG, process 200 reconfigures the network element to be in the same configuration this network element had before the network element was updated. FIG. 5 is a flow diagram of one embodiment of a process 500 to restore the data processing of a network element. In one embodiment, process 500 is performed by a restore module, such as the restore module 612 as described in FIG. 6 below. In one embodiment, process 500 restores the network element configuration in the opposite order that was used in FIG. 3. In FIG. 5, process 500 begins by restoring and verifying the layer 1 configuration. In one embodiment, process 500 restores the layer 1 configuration by applying the layer 1 configuration that this network element had before the network element was put into maintenance mode. In addition and in this embodiment, process 500 verifies the restored layer 1 configuration is valid by looking at the physical layer of the interface and determining if this interface is up. In addition, process 500 can also check if there are any error conditions, such as link fault signaling errors. For example and in one embodiment, process 500 can use a command such as show interface <interface name> transceiver detail and parse the output for any errors.

At block 504, process 500 restores and verifies the layer 2 configuration. In one embodiment, process 500 restores the layer 2 configuration by applying the layer 2 configuration that this network element had before the network element was put into maintenance mode. For example and in one embodiment, if the network element was part of an MLAG, process 500 applies the configuration that configures the network element for the MLAG. In addition, process 500 would bring up a MLAG peer link with the other network elements that are involved in the MLAG. In another example and embodiment, process 500 restores the spanning tree costs for paths that involve the network element being restored. In addition, further verifies that the restored layer 2 configuration. In one embodiment, process 500 can verify the layer 3 configuration by comparing the MLAG and/or other layer 2 configurations before and after the network element was put into maintenance mode. If there are no (or no substantial) differences between the MLAG and/or other layer 2 services, process 500 indicates that the layer 2 configuration is verified. If not, process 500 indicates that the layer 2 configuration is not verified.

Process 500 restores and verifies the layer 3 configuration at block 506. In one embodiment, process 500 restores the layer 3 configuration by applying the layer 3 configuration that this network element had before the network element was put into maintenance mode. In addition and in this embodiment, process 500 verifies the restored layer 3 configuration is valid by comparing the routing table before and after the network element was put into maintenance mode. If there are no (or no substantial) differences between the routing tables, process 500 indicates that the layer 2 configuration is verified. If not, process 500 indicates that the layer 2 configuration is not verified. At block 508, process 500 restores and verifies the routing policy (layer 3) configuration of the network element. In one embodiment, process 500 restores the routing policy configuration by applying the routing policy configuration that this network element had before the network element was put into maintenance mode. For example and in one embodiment, if the route costs were increased as the network element was put into maintenance mode, process 500 restores the route costs back to previous values. In this example, the network element will advertised the restored route costs to other network elements using a routing policy configured on the network element (e.g., border gateway protocol (BGP), open shortest path first (OSPF), or some other routing policy).

Figure 6:
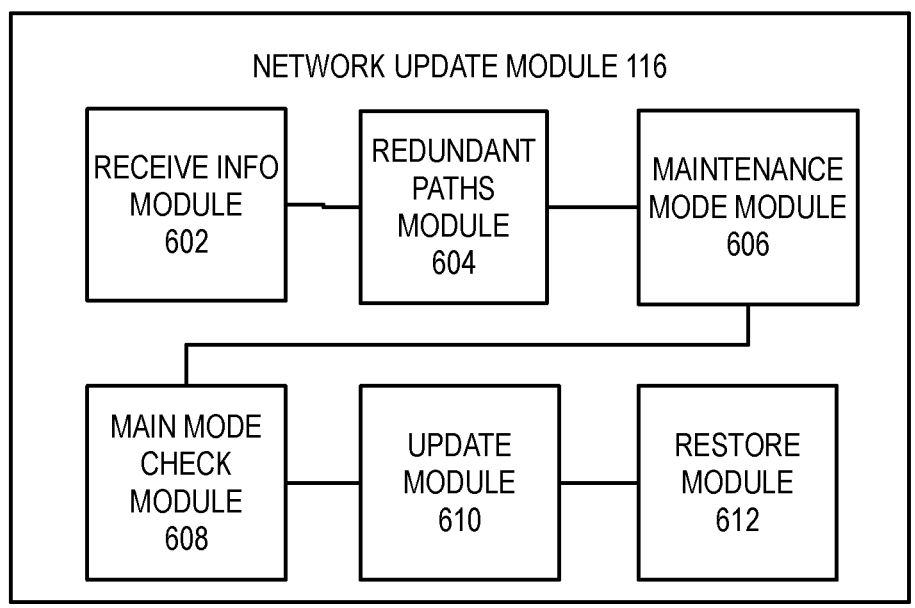
FIG. 6 is a block diagram of one embodiment of a network update module that updates a network element by utilizing redundant network capacity.

FIG. 6 is a block diagram of one embodiment of a network update module 116 that updates a network element by utilizing redundant network capacity. In one embodiment, the network update module includes a receive information module 602, redundant paths module 604, maintenance mode module 606, maintenance mode check module 608, update module 610, and restore module 612. In one embodiment, the receive information module 602 receives the information as described in FIG. 3, block 302 above. The redundant paths module 604 determines if there are redundant paths for this network element as described in FIG. 3, block 304 above. The maintenance mode module 606 puts the network element into maintenance mode as described in FIG. 3, block 306 above. The maintenance mode check module 608 checks that the network element is in maintenance mode as described in FIG. 3, block 308 above. The update module 610 performs the software update as described in FIG. 3, block 310 above. The restore module 612 restores the network element from maintenance mode as described in FIG. 3, block 312 above.

Figure 7:
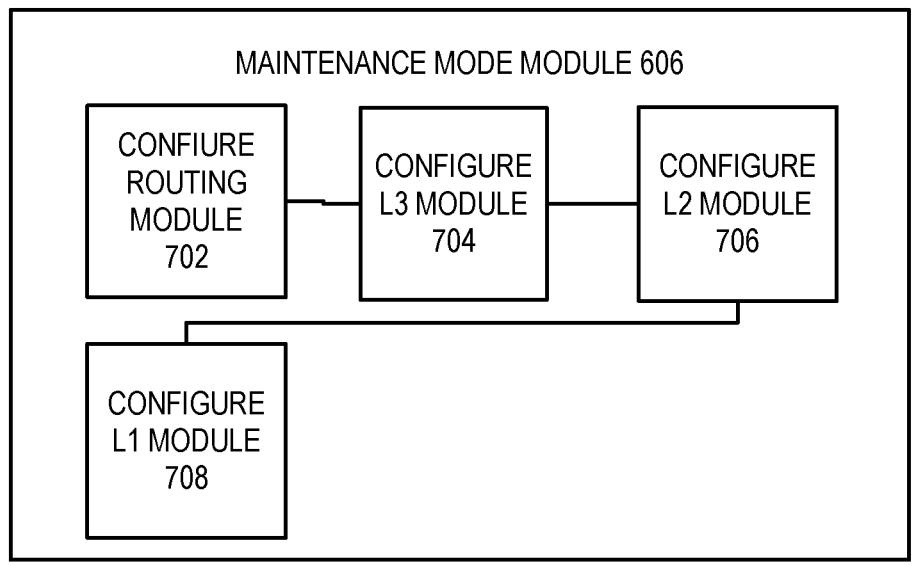
FIG. 7 is a block diagram of one embodiment of a drain data module that drains the data processing of a network element.

FIG. 7 is a block diagram of one embodiment of a maintenance mode module 606 that puts a network element into maintenance mode. In one embodiment, the maintenance mode module 606 includes configure routing module 702, configure layer 3 module 704, configure layer 2 module 706, and configure layer 1 module 708. In one embodiment, the configure routing module 702 configures the routing policy as described in FIG. 3, block 302 above. The configure layer 3 module 704 configures the layer 3 configuration as described in FIG. 3, block 304 above. The configure layer 2 module 706 configures the layer 2 configuration as described in FIG. 3, block 306 above. The configure layer 1 module 708 configures the layer 1 configuration as described in FIG. 3, block 308 above.

Figure 8:
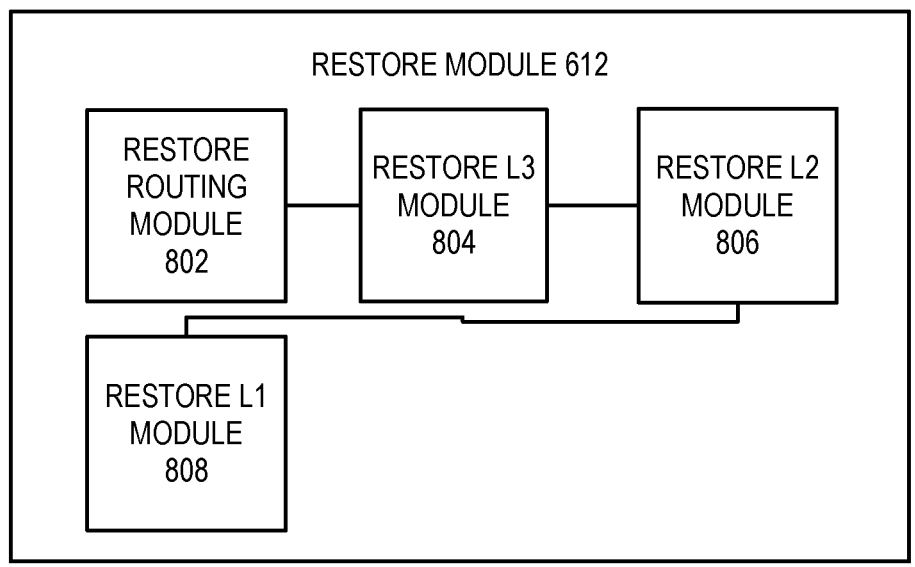
FIG. 8 is a block diagram of one embodiment of a restore data module that restores the data processing of a network element.

FIG. 8 is a block diagram of one embodiment of a restore module 612 that restores the data processing of a network element. In one embodiment, the restore module 612 includes restore routing module 702, restore layer 3 module 704, restore layer 2 module 706, and restore layer 1 module 708. In one embodiment, the restore routing module 702 restores the routing policy as described in FIG. 5, block 502 above. The restore layer 3 module 704 restores the layer 3 configuration as described in FIG. 5, block 504 above. The restore layer 2 module 706 restores the layer 2 configuration as described in FIG. 5, block 506 above. The restore layer 1 module 708 restores the layer 1 configuration as described in FIG. 5, block 508 above.

Figure 9:
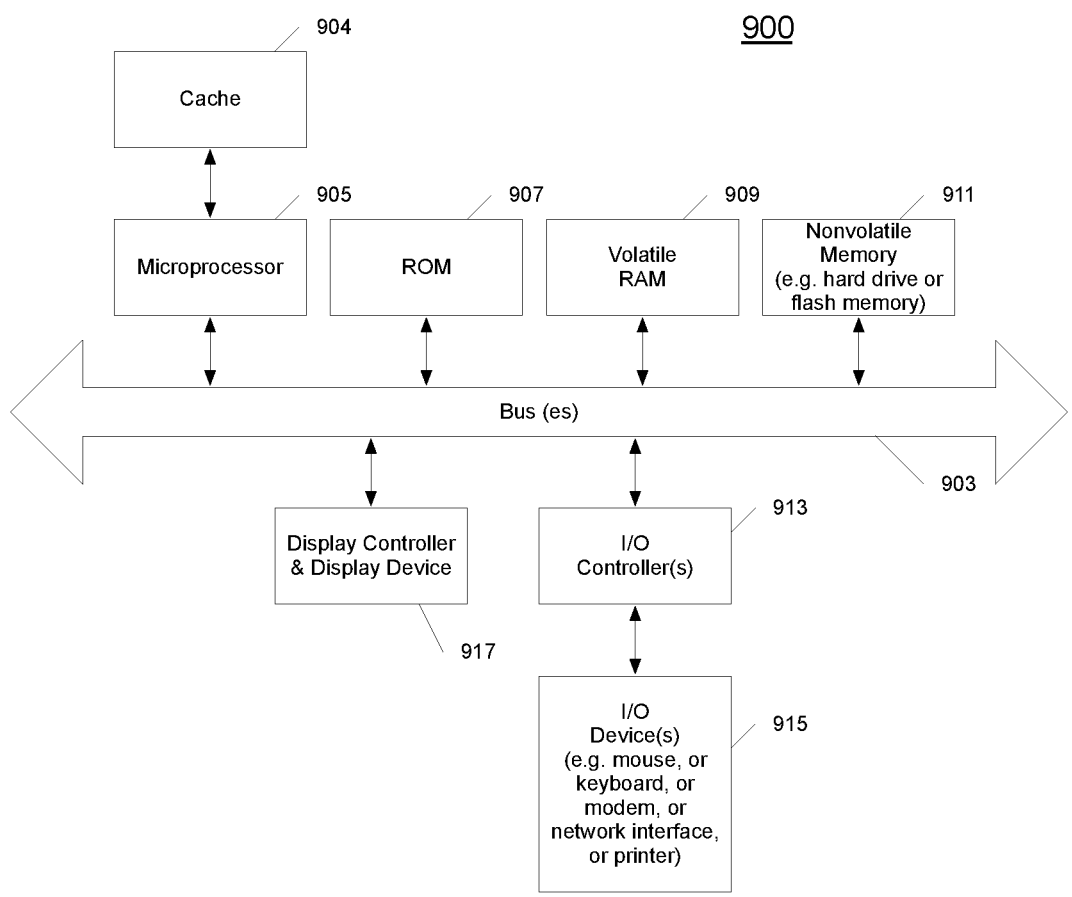
FIG. 9 illustrates one example of a typical computer system, which may be used in conjunction with the embodiments described herein.

FIG. 9 shows one example of a data processing system 900, which may be used with one embodiment of the present invention. For example, the system 900 may be implemented including a controller 102 as shown in FIG. 1. Note that while FIG. 9 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 9, the computer system 900, which is a form of a data processing system, includes a bus 903 which is coupled to a microprocessor(s) 905 and a ROM (Read Only Memory) 907 and volatile RAM 909 and a non-volatile memory 911. The microprocessor 905 may retrieve the instructions from the memories 907, 909, 911 and execute the instructions to perform operations described above. The bus 903 interconnects these various components together and also interconnects these components 905, 907, 909, and 911 to a display controller and display device 917 and to peripheral devices such as input/output (I/O) devices which may be mice, keyboards, modems, network interfaces, printers and other devices which are well known in the art. In one embodiment, the system 900 includes a plurality of network interfaces of the same or different type (e.g., Ethernet copper interface, Ethernet fiber interfaces, wireless, and/or other types of network interfaces). In this embodiment, the system 900 can include a forwarding engine to forward network date received on one interface out another interface.

Typically, the input/output devices 915 are coupled to the system through input/output controllers 913. The volatile RAM (Random Access Memory) 909 is typically implemented as dynamic RAM (DRAM), which requires power continually in order to refresh or maintain the data in the memory.

The mass storage 911 is typically a magnetic hard drive or a magnetic optical drive or an optical drive or a DVD ROM/RAM or a flash memory or other types of memory systems, which maintains data (e.g. large amounts of data) even after power is removed from the system. Typically, the mass storage 911 will also be a random access memory although this is not required. While FIG. 9 shows that the mass storage 911 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 903 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "process virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "determining," "updating," "failing," "signaling," "configuring," "increasing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable storage medium having stored thereon executable instructions for performing a hitless update of a network element, which when executed by one or more processing units, cause the one or more processing units to: increase layer 3 routing costs of the network element; increase layer 2 switching costs of the network element at a time subsequent to increasing the layer 3 routing costs of the network element; shut down physical interfaces of the network element at a time subsequent to increasing layer 2 switching costs of the network element; update the network element; restore the physical interfaces to a configuration prior to shutting down the physical interfaces; configure layer 2 switching in the network element to a configuration prior to increasing the layer 2 switching costs; and configure layer 3 routing in the network element to a configuration prior to increasing the layer 3 routing costs.

2. The non-transitory machine-readable medium of claim 1, wherein the executable instructions, which when executed by the one or more processing units, further cause the one or more processing units to verify that network element is stable subsequent to increasing layer 3 routing costs.

3. The non-transitory machine-readable medium of claim 2, wherein the executable instructions, which when executed by the one or more processing units, further cause the one or more processing units to verify that network element is stable subsequent to increasing layer 2 switching costs.

4. The non-transitory machine-readable medium of claim 1, wherein the executable instructions, which when executed by the one or more processing units, further cause the one or more processing units to verify layer 2 switching and to verify layer 3 switching after layer 2 switching is verified.

5. The non-transitory machine-readable medium of claim 1, wherein the routing cost is a routing metric of a routing protocol.

6. The non-transitory machine-readable medium of claim 5, wherein the routing protocol is selected from the group consisting of Border Gateway Protocol and Open Shortest Path First.

7. The non-transitory machine-readable medium of claim 1, wherein the switching cost is a switching metric of a switching protocol.

8. The non-transitory machine-readable medium of claim 1, further comprising rebooting the network element.

9. A non-transitory machine-readable storage medium having stored thereon executable instructions for performing a hitless update of a network element, which when executed by one or more processing units, cause the one or more processing units to: advertise an increased layer 3 routing cost to other network elements, so that the other network elements subsequently select other paths that do not include the network element; expose an increased layer 2 switching cost of the other network elements at a time subsequent to advertising the increased layer 3 routing cost; shut down physical interfaces of the network element at a time subsequent to exposing the increased layer 2 switching cost; update the network element; restore the physical interfaces to a configuration prior to shutting down the physical interfaces; configure layer 2 switching in the network element to a configuration prior to exposing the increased layer 2 switching cost; and PATENT configure layer 3 routing in the network element to a configuration prior to advertising the increased layer 3 routing cost.

10. The non-transitory machine-readable medium of claim 9, wherein the executable instructions, which when executed by the one or more processing units, further cause the one or more processing units to verify that network element is stable subsequent to advertising the increased layer 3 routing cost.

11. The non-transitory machine-readable medium of claim 10, wherein the executable instructions, which when executed by the one or more processing units, further cause the one or more processing units to verify that network element is stable subsequent to exposing the increased layer 2 switching cost.

12. The non-transitory machine-readable medium of claim 9, wherein the routing cost is a routing metric of a routing protocol.

13. The non-transitory machine-readable medium of claim 12, wherein the routing protocol is selected from the group consisting of Border Gateway Protocol and Open Shortest Path First.

14. The non-transitory machine-readable medium of claim 9, wherein the switching cost is a switching metric of a switching protocol.

15. A method in a network element, the method comprising: draining data processing in the network element by successively configuring the network element to: step (1) drain layer 3 data processing, then step (2) drain layer 2 data processing, then step (3) shut down physical interfaces of the network element, including verifying the network element is stable after step (1) and verifying the network element is stable after step (2); updating the network element; and restoring data processing in the network element by successively restoring the physical interfaces to configurations prior to step (3), then restoring layer 2 data processing to a configuration prior to step (2); and then restoring layer 1 data processing to a configuration prior step (1).

16. The method of claim 15, wherein configuring the network element to drain layer 3 data processing includes increasing layer 3 routing costs.

17. The method of claim 16, wherein the routing cost is a routing metric of a routing protocol.

18. The method of claim 17, wherein the routing protocol is selected from the group consisting of Border Gateway Protocol and Open Shortest Path First.

19. The method of claim 15, wherein configuring the network element to drain layer 2 data processing includes increasing layer 2 switching costs.

20. The method of claim 19, wherein the switching cost is a switching metric of a switching protocol.

* * * * *